US012019154B2

(12) United States Patent
Crowell (10) Patent No.: US 12,019,154 B2
(45) Date of Patent: *Jun. 25, 2024

(54) UNDERWATER ACOUSTIC TRACKING AND TWO WAY MESSAGING SYSTEM

(71) Applicant: L3 Technologies, Inc., New York, NY (US)

(72) Inventor: Jonathan C. Crowell, Dorchester, MA (US)

(73) Assignee: L3 Technologies, Inc., New York, NY (US)

(*) Notice: Subject to any disclaimer, the term of this patent is extended or adjusted under 35 U.S.C. 154(b) by 869 days.

This patent is subject to a terminal disclaimer.

(21) Appl. No.: 16/774,866

(22) Filed: Jan. 28, 2020

(65) Prior Publication Data

US 2020/0271780 A1    Aug. 27, 2020

Related U.S. Application Data

(63) Continuation of application No. 15/259,077, filed on Sep. 8, 2016, now Pat. No. 10,656,267.

(Continued)

(51) Int. Cl.
*G01S 15/66* (2006.01)
*G01S 3/808* (2006.01)
(Continued)

(52) U.S. Cl.
CPC .............. *G01S 15/66* (2013.01); *G01S 3/808* (2013.01); *G01S 5/22* (2013.01); *H04B 13/02* (2013.01); *H04W 84/005* (2013.01)

(58) Field of Classification Search
None
See application file for complete search history.

(56) References Cited

U.S. PATENT DOCUMENTS

| 3,896,411 A | 7/1975 | Mackey et al. |
| 3,928,840 A | 12/1975 | Spindel et al. |

(Continued)

FOREIGN PATENT DOCUMENTS

| CA | 2054915 A1 | 6/1992 |
| EP | 0642033 B1 | 3/2001 |

(Continued)

OTHER PUBLICATIONS

**[No Author Listed] MicronNav—USBL Tracking System, <http://www.tritech.co.uk/product/usbl-tracking-system-micronnav> © Copyright Tritech International Limited 2017.

(Continued)

*Primary Examiner* — Hovhannes Baghdasaryan
(74) *Attorney, Agent, or Firm* — Nutter McClennen & Fish LLP (57) ABSTRACT

A system where a large number of underwater devices can transmit their precise position relative to a fixed underwater beacon, by transmitting two short duration, precisely timed acoustic tones (pings). The arrival time of the pulses at the fixed underwater transceiver beacon will relay the transmitter's precise position relative to that beacon. The two pings code for two numbers; either the range and bearing or an X, Y coordinate of each object with respect to the beacon. Data messages can be sent to and received from the beacon, used for command, control and status. The pulses can be a single frequency and have duration of around a 1 ms and operate one or many frequencies to allow multiple cycles to be overlapped in time. This coding scheme allows many devices to send the data simultaneously in the cycle for group tracking from last position or as independent cycles for unambiguous tracking. The transducers used in the system can be omni-directional hydrophones. The tracking grid size is a function of the acoustic frequency chosen and (Continued)

range from 1000 m for 40 KHz and 6000 m for 8 kHz. The system requires that all nodes in the system keep precise synchronized time.

20 Claims, 6 Drawing Sheets

Related U.S. Application Data (60) Provisional application No. 62/215,365, filed on Sep. 8, 2015.

(51) Int. Cl.
*G01S 5/22* (2006.01)
*H04B 13/02* (2006.01)
*H04W 84/00* (2009.01)

(56) References Cited

U.S. PATENT DOCUMENTS

| | | | |
|---|---|---|---|
| 4,315,326 A | 2/1982 | Chase, Jr. | |
| 4,463,452 A | 7/1984 | Chase, Jr. | |
| 5,119,341 A | 6/1992 | Youngberg | |
| 5,124,955 A | 6/1992 | Jackson et al. | |
| 5,140,927 A | 8/1992 | Tolefson | |
| 5,291,194 A | 3/1994 | Ames | |
| 5,331,602 A | 7/1994 | McLaren | |
| 5,359,575 A | 10/1994 | Williams et al. | |
| 5,377,165 A | 12/1994 | LaPointe et al. | |
| 5,379,034 A | 1/1995 | O'Connell | |
| 5,579,285 A | 11/1996 | Hubert | |
| 5,642,330 A | 6/1997 | Santopietro | |
| 5,784,339 A | 7/1998 | Woodsum et al. | |
| 5,790,070 A | 8/1998 | Natarajan et al. | |
| 6,058,874 A | 5/2000 | Glenning et al. | |
| 6,097,670 A | 8/2000 | Johnson | |
| 6,416,369 B1 | 7/2002 | Coakley | |
| 6,443,383 B1 | 9/2002 | Stasny et al. | |
| 6,501,704 B2 | 12/2002 | Nishimura | |
| 6,532,192 B1 | 3/2003 | Reid | |
| 6,657,585 B1 | 12/2003 | Kucik | |
| 6,701,252 B2 | 3/2004 | Brown | |
| 6,907,839 B2 | 6/2005 | Kruger et al. | |
| 6,941,226 B2 | 9/2005 | Estep | |
| 6,961,657 B1 | 11/2005 | Wernli et al. | |
| 6,972,715 B2 | 12/2005 | Hollis et al. | |
| 6,989,525 B2 | 1/2006 | Howard | |
| 7,230,881 B2 | 6/2007 | Howard et al. | |
| 7,512,036 B2 | 3/2009 | Crowell | |
| 7,859,944 B2 | 12/2010 | Zhou et al. | |
| 8,009,515 B2 | 8/2011 | Cecala et al. | |
| 8,009,516 B2 | 8/2011 | Crowell | |
| 8,009,616 B2 | 8/2011 | Saito | |
| 9,641,262 B2 | 5/2017 | Crowell | |
| 10,656,267 B2 | 5/2020 | Crowell | |
| 2002/0140599 A1 | 10/2002 | King | |
| 2003/0061002 A1 | 3/2003 | Steinbrecher | |
| 2004/0090865 A1 | 5/2004 | Davies et al. | |
| 2005/0058022 A1 | 3/2005 | Kitchin et al. | |
| 2005/0180263 A1 | 8/2005 | Lambert et al. | |
| 2005/0219950 A1 | 10/2005 | Rowe | |
| 2007/0014189 A1 | 1/2007 | Basilico | |
| 2007/0025185 A1* | 2/2007 | Green | G01S 3/808 367/124 |
| 2008/0037370 A1 | 2/2008 | Crowell | |
| 2009/0196122 A1 | 8/2009 | Crowell | |
| 2009/0216444 A1 | 8/2009 | Crowell | |
| 2011/0096632 A1 | 4/2011 | Pearce et al. | |
| 2011/0144930 A1 | 6/2011 | Bruno et al. | |
| 2012/0213034 A1 | 8/2012 | Imran | |
| 2012/0243375 A1* | 9/2012 | Melvin, II | G01S 15/876 367/118 |
| 2013/0003498 A1 | 1/2013 | L'Her et al. | |
| 2015/0288459 A1 | 10/2015 | Crowell | |
| 2017/0067993 A1 | 3/2017 | Crowell | |

FOREIGN PATENT DOCUMENTS

| | | |
|---|---|---|
| WO | 02/01248 A1 | 1/2002 |
| WO | 2007022233 A2 | 2/2007 |
| WO | 2015/153576 A3 | 11/2015 |

OTHER PUBLICATIONS

**Veness, C., Movable Type Scripts, "Calculate distance, bearing and more between Latitude/Longitude points," <http://www.movable-type.co.uk/scripts/latlong.html> © 2002-2017 Chris Veness.
International Search Report and Written Opinion for Application No. PCT/US15/23541, mailed Jul. 21, 2015 (9 pages).
International Search Report and Written Opinion for Application No. PCT/US06/31928 issued Mar. 19, 2007.
International Search Report and Written Opinion, from PCT/US07/004170, mailed Jun. 19, 2008.
Molins, et al., Slotted FAMA: A MAC protocol for underwater acoustic networks. Massachusetts Institute of Technology. Proceedings of the IEEE OCEANS '06 Asia Conference, pp. 1-7, May 2006.
Noh, et al., DOTS: A propagation delay-aware opportunistic MAC protocol for underwater sensor networks. 2010 IEEE International Conference on Network Protocols (ICNP), Oct. 5-8, 2010, pp. 183-192.
SEABED "3010 Multi Purpose System: SEABED 3010-MP" Jul. 15, 2002 [http://webarchive.org/web/20020715153703/http:t bed.nl/main_3010.htm].
Tin, et al., Network burst monitoring and detection based on fractal dimension with adaptive time-slot monitoring mechanism. Journal of Marine Science and Technology, vol. 21, No. 6, pp. 686-694 (2013).

* cited by examiner

FIGURE 1

```
Vehicles
25.2846896624208;-80.2479237010538;
25.2871759344039;-80.2422333922713;
25.2905913351364;-80.2461005924147;
25.2868494571833;-80.2531167983892;
25.288155360735;-80.2494982039693;

Beacons
25.2827056306445;-80.2500782839908;1;21;
25.2827977979235;-80.2401451041938;18;
25.2918720853398;-80.2403274150577;15;
25.2917967474711;-80.250271643998;10;
```

Great-circle distance between two points

Enter the co-ordinates into the text boxes to try out the calculations. A variety of formats are accepted, principally:

* deg-min-sec suffixed with N/S/E/W (e.g. 40°44'55"N, 73 59 11W), or
* signed decimal degrees without compass direction, where negative indicates west/south (e.g. 40.7486, -73.9864);

Point 1: 25.28270583 , 80.25007828
Point 2: 25.20468986 , -80.2478237

Distance: 0.3092 km
Initial bearing: 044°28'38"
Final bearing: 044°28'41"

Distance

This uses the 'haversine' formula to calculate the great-circle distance between two points – that is, the shortest distance over the earth's surface – giving an 'as-the-crow-flies' distance between the points (ignoring any hills they fly over, of course!).

Haversine formula:
$a = \sin^2(\Delta\varphi/2) + \cos\varphi_1 \cdot \cos\varphi_2 \cdot \sin^2(\Delta\lambda/2)$
$c = 2 \cdot \operatorname{atan2}(\sqrt{a}, \sqrt{(1-a)})$
$d = R \cdot c$ where $\varphi$ is latitude, $\lambda$ is longitude, R is earth's radius (mean radius = 6,371km);
note that angles need to be in radians to pass to trig functions!

Bearing

In general, your current heading will vary as you follow a great circle path (orthodrome); the final heading will differ from the initial heading by varying degrees according to distance and latitude (if you were to go from say 35°N,45°E (≈ Baghdad) to 35°N,135°E (≈ Osaka), you would start on a heading of 60° and end up on a heading of 120°!).

This formula is for the initial bearing (sometimes referred to as forward azimuth) which if followed in a straight line along a great-circle arc will take you from the start point to the end point:[1]

Formula: $\theta = \operatorname{atan2}(\sin\Delta\lambda \cdot \cos\varphi_2, \cos\varphi_1 \cdot \sin\varphi_2 - \sin\varphi_1 \cdot \cos\varphi_2 \cdot \cos\Delta\lambda)$

*FIGURE 7*

UNDERWATER ACOUSTIC TRACKING AND TWO WAY MESSAGING SYSTEM

RELATED APPLICATIONS

This application is a continuation of U.S. application Ser. No. 15/259,077, filed on Sep. 8, 2016 entitled "Underwater Acoustic Tracking and Two Way Messaging System," which claims priority to U.S. Provisional Patent Application No. 62/215,365, filed on Sep. 8, 2015, and entitled "Underwater Acoustic Tracking and Two Way Messaging System". Each of these applications are incorporated by reference herein in their entirety.

BACKGROUND

Underwater tracking ranges are used to track vehicles in operation. Traditionally this is accomplished using underwater acoustic triangulation systems. Acoustic pulses are transmitted from the moving underwater objects and received by a plurality (generally four or more) underwater hydrophones. By measuring the arrival time at these hydrophones in a synchronized time domain along with the positions of the hydrophones in x, y, z (latitude, longitude, depth) the vehicle position can be determined. These systems generally are good at tracking each vehicle at a different frequency or coded pulse so the range sets can be applied to a unique vehicle. These fixed systems are very expensive and complicated to use in portable applications.

Some general systems use underwater modems and transmit the vehicles position to a node that tracks the objects position. These modems send a large amount of data bits to transfer the position due to the very large overhead required by a modem. These modem system use a broadband signal and take up a large portion of the acoustic channel. They could interfere with underwater positioning system such as described in U.S. Pat. No. 8,009,516. If you transmit a range and bearing with 16 s bit of precision using an acoustic modem with 100 bps data rate and 50% bit efficiency that will 16 bits/0.50=32 bits at 100 bps will use up over 32% of the data channel for a 1 second cycle. The current invention allows sending a range or bearing ping that is 0.5 ms in length will take up 0.05% of the data channel. This is important since many nodes can transmit the data in the same cycle for a shared cycle.

More flexible systems in operation use USBL (ultra short baseline) acoustic systems that can be mounted on a moving boat or moored. These devices use a related transponder/responder on the underwater vehicle that receives a signal and resolves a range and bearing. MicronNav-USBL Tracking System is one such system. These generally have limited range, high complexity and cost and limited resolution of bearing used to project the position.

The GIB-plus system, available from the ACSA subsidiary of the Alcen Group of Paris, France, is a system that uses four or more moored surface beacons that listen for pings from an underwater object. It can support up to 5 devices to be tracked, each requiring a separate frequency to resolve the ranges for triangulation. The beacons on the surface with radio links and GPS for position and timing log when the sound arrives from the device being tracked. The data from four beacons is transmitted by radio to a single computer that uses the time delays for each frequency pinger to triangulate a location with respect to each surface beacon. The device underwater that is being tracked doesn't know its own position.

BRIEF DESCRIPTION OF THE DRAWINGS

FIG. 7 illustrates a calculator, as well as the rationale for calculating the distance and bearing, which can al so be found at: www.movable-type.co.uk.

SUMMARY

The invention provides systems and methods for tracking a position of an underwater device and two way communication. In one aspect, a method for tracking a position of an underwater device is provided. In the method, a beacon on or below the surface of the water is provided, the beacon being located in a known position. A device-to-track is also provided below the surface of the water, the device-to-track being located in a known position with respect to the beacon. Each of the beacon and the device-to-track are provided with a synchronized time base. A range acoustic pulse is sent from the device to locate to the beacon, the timing of the range acoustic pulse representing a range from the device to locate to the beacon. A bearing acoustic pulse is sent from the device to locate to the beacon, the timing of the bearing acoustic pulse representing a bearing from the device to locate to the beacon. The location of the device to be tracked is calculated based on the range from the device to locate to the beacon, the bearing from the device to locate to the beacon, and the known position of the beacon.

In a further aspect, the invention provides a method for tracking a position of an underwater device. A beacon is provided on or below the surface of the water, the beacon being located in a known position. A device-to-track is also provided below the surface of the water, the device-to-track being located in a known position with respect to the beacon. Each of the beacon and the device-to-track are provided with a synchronized time base. A first range acoustic pulse is sent from the device to locate to the beacon, the timing of the range acoustic pulse representing a range from the device to locate to the beacon in a first direction. A second range acoustic pulse is sent from the device to locate to the beacon, the timing of the second range acoustic pulse representing a range from the device to locate to the beacon in a second direction that is orthogonal to the first direction. The location of the device to be tracked is calculated based on the range from the device to locate to the beacon in the first direction, the range from the device to locate to the beacon in the second direction, and the known position of the beacon.

In a still further aspect, the invention provides a method for tracking a position of an underwater device. A beacon is provided on or below the surface of the water, the beacon being located in a known position. A device-to-track is provided below the surface of the water, the device-to-track being located in a known position with respect to the beacon. Each of the beacon and the device-to-track are provided with a synchronized time base. A first location acoustic pulse is sent from the device to locate to the beacon, the timing of the range acoustic pulse representing a first location information from the device to locate to the beacon. A second location acoustic pulse is sent from the device to locate to the beacon, the timing of the second range acoustic pulse representing a second location information from the device to locate to the beacon. The location of the device to be tracked is calculated based on the first location information, the second location information, and the known position of the beacon.

In one embodiment, the first location information is a range and the second location information is a bearing. In a further embodiment, the first location information is a range in a first direction and the second location information is a range in a second direction that is orthogonal to the first direction.

DETAILED DESCRIPTION

The present invention can be implemented using at least one underwater device-to-track and at least one beacon. In a preferred embodiment, there are multiple devices-to-track and multiple beacons. In order to operate, the device-to-track should know its own location relative to a "gateway beacon." In one embodiment, the underwater device-to-track is aware of its own position (latitude and longitude, for example) and depth, as well as the latitude, longitude, and depth (if it is not on the surface) of the gateway beacon. More particularly, the device-to-track should know the sound travel time to the gateway beacon.

The tracking scheme of the invention can include transmitting the position of a device-to-track to a particular gateway beacon using two short duration acoustic pulses sent to signify two coordinates of the device-to-track relative to the gateway beacon. The preferred data is RANGE and BEARING to or from the gateway beacon. An alternate scheme could be defined using northing and easting value in meters from the beacon.

Each node in the system, beacons and devices-to-track, preferably has a precise synchronized time base. In the general case this can be the GPS atomic time standard that is broadcast from most low cost GPS receivers with PPS output. It can then be maintained in accurate GPS Disciplined oscillators or small atomic clocks such as the SA.45 miniature atomic clock available from Microsemi of Aliso Viejo, California. The clock drift while underwater should be small so as to avoid adding timing errors to the transmitted data.

A preferred implementation of the invention can use the positioning system of U.S. Pat. No. 8,009,516 (incorporated by reference herein in its entirety) for each device-to-track to know its precise position. In that disclosed system, each device-to-locate and beacon (that is, each node) has all of the required hardware (accurate clocks, acoustic transceivers, processors) such that each device-to-locate will know both its own position (latitude, longitude and depth) as well as the precise sound travel time to all positioning beacons. In this implementation, the devices-to-locate of U.S. Pat. No. 8,009,516 become devices-to-track in the present invention. One of the beacons illustrated in U.S. Pat. No. 8,009,516 would be defined as the master beacon for the current scheme to use for tracking and data transfer. The current invention can be added to that prior system with only software changes, sharing all of the hardware. The gateway beacon used can change from cycle to cycle and may be defined by pre-arrangement or with some transmitted messages defined by a given scheme. Using multiple frequencies, several beacons could be masters for different remote nodes with no conflicts.

Figure 5:
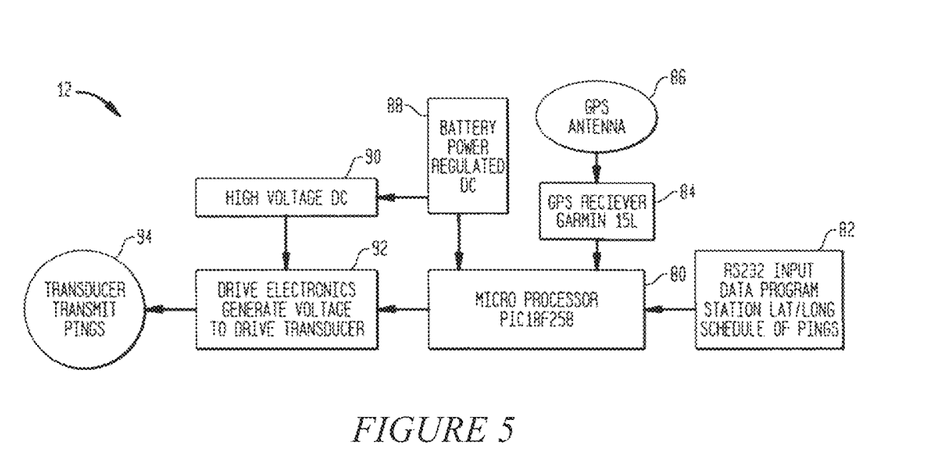
FIG. 5 illustrates a block diagram for a beacon that can be used in the embodiment of FIG. 1.

FIG. 5 provides a block diagram illustrating the electronic components for one embodiment of a beacon 12 for use with the invention. The beacon 12 includes a microprocessor 80 that drives the logical operation of the buoy. In one exemplary embodiment, the microprocessor 80 can be a PIC microprocessor available from Microchip Technology, Inc. of Chandler, Ariz., for example a PIC18F258 or similar microprocessor. An RS232 input data program station 82 can be provided to communicate with the microprocessor 80, for example, to load schedule and position data. A GPS Receiver 84, with associated GPS Antenna 86, are connected to the processor 80. In one exemplary embodiment, the GPS Receiver 84 can be a Garmin OEM system GPS15L (available from Garmin International, Inc. of Olathe, Kans.). This GPS Receiver 84 can also include a highly accurate one-pulse-per-second (PPS) output. The GPS One-Pulse-Per-Second (PPS) output pulse edge can happen in a synchronized fashion across all GPS receivers in the buoys 12 and is linked to the Atomic Clock domains on the GPS constellation. The output is highly accurate and is provided for the use of applications requiring precise timing measurements. It can be used in the present invention, along with an ASCII time output, to provide a synchronized time base when all devices are above the surface of the water. The devices-to-track synch onto this time when they are above the water and maintain the time using a temperature-stabilized oscillator when underwater. The GPS PPS signal can be generated after the initial position fix has been calculated and can continue until power down. The rising edge of the signal is synchronized to the start of each GPS second. To obtain the most accurate results, the PPS output can be calibrated against a local time reference to compensate for cable and internal receiver delays and the local time bias.

Beacon 12 electronics can also include a power source such as battery 88 having a regulated DC output to power the microprocessor 80. A high voltage DC converter 90 can also be connected between the battery 88 and drive electronics 92, which drive a transducer 94 to create the ping signals.

Figure 6:
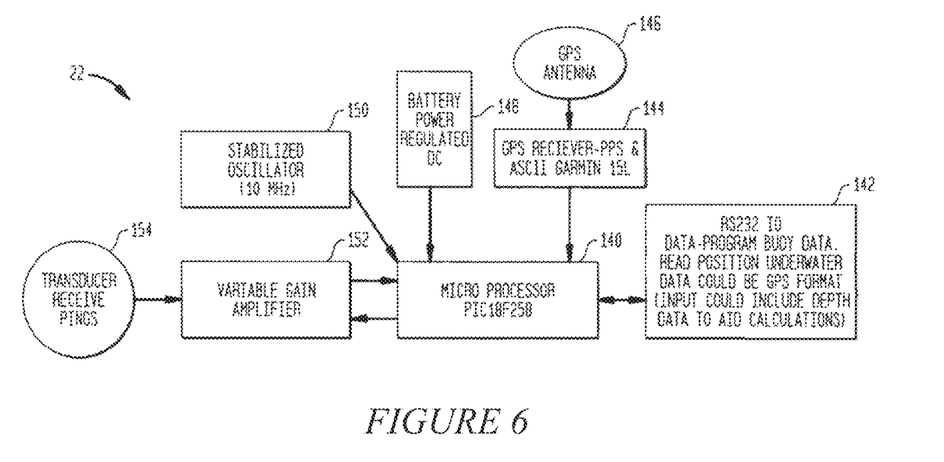
FIG. 6 illustrates a block diagram for a device-to-track that can be used in the embodiment of FIG. 1.

Referring now to FIG. 6, a block diagram representing the electronics for a device-to-track 22 useful with the invention is illustrated. The device-to-track can include a microprocessor 140, GPS Receiver 144, GPS antenna 146, and battery 148 similar to those provided for the beacon 12 electronics described above. A stabilized oscillator 150 is included to provide for maintaining time synchronization to the GPS atomic clock when the device is working underwater. The oscillator 150 could be, for example, a FOX Model FPC5 AF Series 50.8 mm×50.8 mm oven controlled crystal oscillator, or any other suitable device known in the art. The standard versions of such an oscillator can provide a very low drift of 2 parts per billion when warmed up to their operating temperature after 3 minutes. In one embodiment, this clock may operate at 10 MHz and provide the clock signal for the microprocessor 140. The 10 MHz clock is timed and synchronized to the PPS GPS clock when above water. The stability and accuracy of the oscillator is compared to the GPS clock while the device is above water and any frequency errors can be adjusted out of the system with a correction factor, such as add 5 nanoseconds every second, etc. A low drift clock that is synchronized to the GPS clocks on the buoys, combined with a schedule, can allow the device-to-track to know a priori when the acoustic data is to be sent. This feature, also present in the beacons 12, allows use of the time of arrival of a scheduled acoustic pulse to derive the distance traveled. In a system with 2 ppb of frequency error or better, this can work out to a timing error of 0.86 milliseconds over a 12 hour period underwater, this relates to distance error of 0.13 meter measurement error of the distance from the buoys. This allows for a very accurate sub meter measurement of the underwater position over a useful mission time. More accurate timing (currently available commercial devices have 0.5 or lower ppb of frequency error) will result in more accurate position resolution.

A variable gain amplifier 152 can be connected to the microprocessor 140, and also to a transducer 154 that receives the acoustic signals from the beacons 12.

Figure 1:
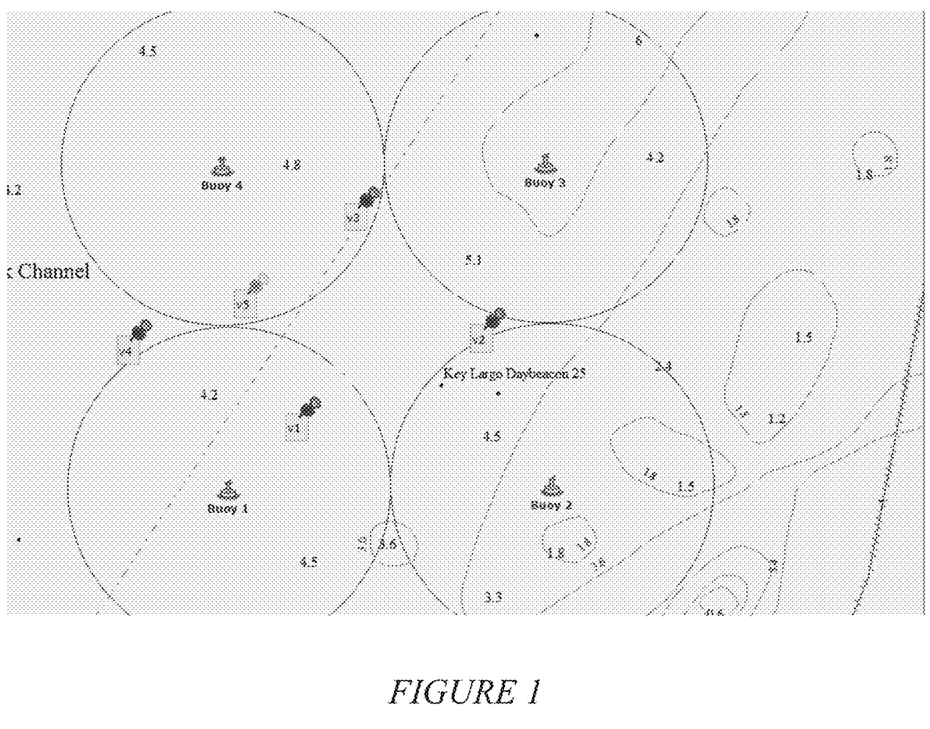
FIG. 1 illustrates an embodiment of the invention having four moored beacons and five underwater vehicles being tracked.
Figure 2:
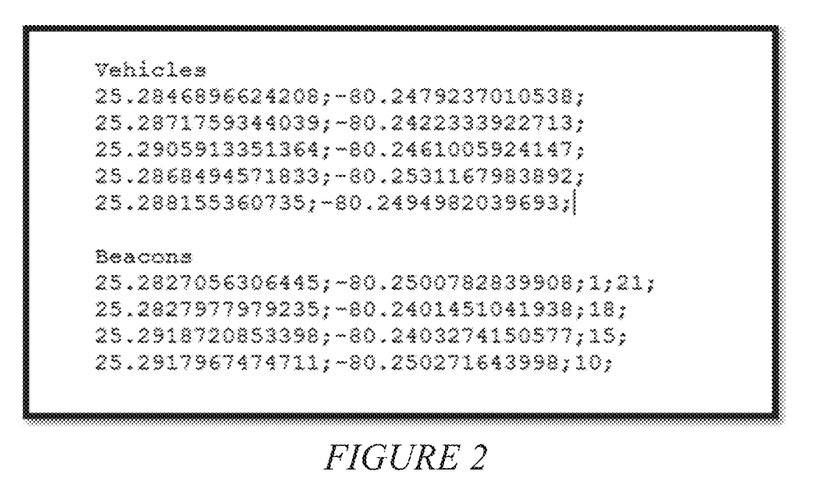
FIG. 2 illustrates the latitude, longitude, and depth of the four moored beacons of FIG. 1, as well as the current position of the five underwater vehicles being tracked in latitude and longitude.

FIG. 1 illustrates a tracking system of the invention with moored beacons labeled as Buoy 1 through Buoy 4 and devices-to-track labeled v1 through v5. In this embodiment, the devices-to-track are autonomous underwater vehicles (AUVs), though in other embodiments they could be devices affixed to divers or any other type of mobile underwater device and the moored beacons are arranged in a 1000 m box. FIG. 2 provides the moored position of each beacon of FIG. 1 in latitude, longitude and depth. It also shows the current position of the five devices-to-track in the system at this instant in time. In this example, a sound frequency of 25 Khz that can travel about 2000 m with good reception is assumed. A speed of sound in water of approximately 1500 m/s is also assumed, though the precise value may depend on salinity and temperature of the water, among other potential variables. The 1000 m box allows the sound to traverse the box in ⅔ of the one second cycle defined for this example. Table 1 provides calculated values of the RANGE (meters) and BEARING (degrees true north) to get from beacon 1 (master for this example; labeled as Buoy 1), as well as the travel time for sound to or from beacon 1.

In the illustrated embodiment, the features of U.S. Pat. No. 8,009,516 usable such that the beacons can transmit the ranging pulses and an unlimited number of devices-to-locate can use these signals to calculate their precise position underwater. These devices-to-locate will all be in a listen-only mode similar to GPS enabled devices in terrestrial applications. The tracking and data transfer functions of the current invention can be implemented on the devices and won't interfere with the operation of the locating system; they overlay cleanly. The locating system of U.S. Pat. No. 8,009,516 relies on receipt by the devices-to-locate of range pulses sent according to a schedule from the beacons that arrive within a fairly accurately defined arrival window fairly based on the relatively slow changes in position of the device-to-locate between each cycle (each cycle typically being one second). The present invention can make use of the time after the range pulse time window to send data out to the beacon with no conflict. The range and bearing pulses sent to the beacon can come in a separate time slot or at a different frequency so that they won't conflict.

When tracking devices using range and bearing to a gateway beacon, the bearing from each device-to-track to the current master beacon can be calculated. Since the position of the device-to-track is known, and the position of the master beacon is known, the device-to-track can calculate the bearing to the beacon. The calculations to find the bearing using great circle math are shown below, and the initial bearing is used to draw a line for calculating distance. A calculator, as well as the rationale for calculating the distance and bearing, can be found at: www.movable-type.co.uk. These are reproduced as FIG. 7.

FIG. 2 provides the position of the beacons and devices-to-track, while Table 1 provides the calculated distance and bearing between each device-to-track and beacon 1. This is the data that is transmitted to report the positions of the devices-to-track. The values in Table 1 will be used as the example of how to transmit this date to beacon 1. In practice, these would be updated in real time and the latest calculations used in the transmissions.

TABLE 1

Calculated Range, Bearing and sound travel time between each vehicle and beacon1

| Vehicle | Range(m) | Bearing(deg) | Travel Time (seconds) |
|---|---|---|---|
| v1 | 309.2 | 44.46 | 0.20613 |
| v2 | 932.3 | 57.76 | 0.62153 |
| v3 | 963.7 | 24.5 | 0.64247 |
| v4 | 552.8 | 326.45 | 0.36853 |
| v5 | 608.8 | 5.49 | 0.40587 |

In one embodiment, a single frequency ping is used for all data. For example, 25 Khz with a pulse duration of 1 ms for both transmission from the beacons to vehicles (to determine position) and from the vehicles to the beacons (to report the position). An example system schedule is shown in Table 2 below. Sound can travel approximately 1500 meters in 1 second underwater, so the usable range of this system using a 1 second cycle time is 1.5 km minus the distance consumed by the data that must ripple through the system before the next cycle. By using longer cycles, this system can be extended at the cost of a reduced update rate for position and fewer cycles of tracking information and message transfers. The system can be designed so that multiple sound frequencies are in use in the same scheme. With six distinct frequencies, all data could be transmitted in each cycle, making the update rate much faster, while using more bandwidth in the water. In general an acoustic transducer can operate over a given bandwidth based on its design. As an example a 32 Khz transducer may provide acceptable transmit power and receiver sensitivity to operate over a range from 25 Khz to 38 Khz.

TABLE 2

Repeating schedule of an example single frequency system showing 60 second repeating cycle

| Time (sec) | cycle | Function |
|---|---|---|
| 0 | 0 | Beacon1 Sends Range Ping + 16 bits (addr + data) |
| 1 | 1 | Beacon2 Sends Range Ping + 16 bits (addr + data) |
| 2 | 2 | Beacon3 Sends Range Ping + 16 bits (addr + data) |
| 3 | 3 | Beacon4 Sends Range Ping + 16 bits (addr + data) |
| 4 | 4 | V1 Sends Range + 8 bits of data |
| 5 | 5 | V1 sends Bearing |
| 6 | 6 | V2 sends Bearing |
| 7 | 7 | V2 Sends Range + 8 bits of data |
| 8 | 0 | Beacon1 Sends Range Ping + 16 bits (addr + data) |
| 9 | 1 | Beacon2 Sends Range Ping + 16 bits (addr + data) |
| 10 | 2 | Beacon3 Sends Range Ping + 16 bits (addr + data) |
| 11 | 3 | Beacon4 Sends Range Ping + 16 bits (addr + data) |

TABLE 2-continued

Repeating schedule of an example single frequency system showing 60 second repeating cycle

| Time (sec) | cycle | Function |
|---|---|---|
| 12 | 4 | V3 Sends Range + 8 bits of data |
| 13 | 5 | V3 sends Bearing |
| 14 | 6 | ALL Vehicles Send Bearing |
| 15 | 7 | ALL Vehicles send Range |
| 16 | 0 | Beacon1 Sends Range Ping + 16 bits (addr + data) |
| 17 | 1 | Beacon2 Sends Range Ping + 16 bits (addr + data) |
| 18 | 2 | Beacon3 Sends Range Ping + 16 bits (addr + data) |
| 19 | 3 | Beacon4 Sends Range Ping + 16 bits (addr + data) |
| 20 | 4 | V4 Sends Range + 8 bits of data |
| 21 | 5 | V4 sends Bearing |
| 22 | 6 | V5 sends Bearing |
| 23 | 7 | V5 Sends Range + 8 bits of data |
| 24 | 0 | Beacon1 Sends Range Ping + 16 bits (addr + data) |
| 25 | 1 | Beacon2 Sends Range Ping + 16 bits (addr + data) |
| 26 | 2 | Beacon3 Sends Range Ping + 16 bits (addr + data) |
| 27 | 3 | Beacon4 Sends Range Ping + 16 bits (addr + data) |
| 28 | 4 | ALL Vehicles Send Range |
| 29 | 5 | ALL Vehicles send Bearing |
| 30 | 6 | V6 sends Bearing |
| 31 | 7 | V6 Sends Range + 8 bits of data |
| 32 | 0 | Beacon1 Sends Range Ping + 16 bits (addr + data) |
| 33 | 1 | Beacon2 Sends Range Ping + 16 bits (addr + data) |
| 34 | 2 | Beacon3 Sends Range Ping + 16 bits (addr + data) |
| 35 | 3 | Beacon4 Sends Range Ping + 16 bits (addr + data) |
| 36 | 4 | V7 Sends Range + 8 bits of data |
| 37 | 5 | V7 sends Bearing |
| 38 | 6 | ALL Vehicles send Bearing |
| 39 | 7 | ALL Vehicles send range |
| 40 | 0 | Beacon1 Sends Range Ping + 16 bits (addr + data) |
| 41 | 1 | Beacon2 Sends Range Ping + 16 bits (addr + data) |
| 42 | 2 | Beacon3 Sends Range Ping + 16 bits (addr + data) |
| 43 | 3 | Beacon4 Sends Range Ping + 16 bits (addr + data) |
| 44 | 4 | V8 Sends Range + 8 bits of data |
| 45 | 5 | V8 sends Bearing |
| 46 | 6 | V9 sends Bearing |
| 47 | 7 | V9 Sends Range + 8 bits of data |
| 48 | 0 | Beacon1 Sends Range Ping + 16 bits (addr + data) |
| 49 | 1 | Beacon2 Sends Range Ping + 16 bits (addr + data) |
| 50 | 2 | Beacon3 Sends Range Ping + 16 bits (addr + data) |
| 51 | 3 | Beacon4 Sends Range Ping + 16 bits (addr + data) |
| 52 | 4 | V10 Sends Range + 8 bits of data |
| 53 | 5 | V9 sends Bearing |
| 54 | 6 | ALL Vehicles Send Bearing |
| 55 | 7 | ALL Vehicles send Range |
| 56 | 0 | Beacon1 Sends Range + 16 bits system data |
| 57 | 1 | Beacon2 Sends Range + 16 bits system data |
| 58 | 2 | Beacon3 Sends Range + 16 bits system data |
| 59 | 3 | Beacon4 Sends Range + 16 bits system data |

A method for transmitting the exact RANGE and BEARING in this system can use a very short duration tone of a single frequency sent according to a schedule, for example, at a specific time within the one second cycle, including, for example, at the top of that cycle. In this example we will use 32 Khz, 1 ms pulse (ping), at 1500 m/s it's about 1.5 m in length in the water. While the length of the tone can be much shorter, the 1 ms value allows the receiver to qualify the received pulse for amplitude, integrated energy and shape to provide significant noise immunity. The receiver can be set up to listen for tones that match the pulses to see if a frequency is clear in the operating area, recommending or selecting a frequency to use.

To send the range the vehicles will send a ping at the top of the second all beacons and vehicles know the sound speed as it can be transmitted in the last four seconds of the cycle. The master beacon, in this case for the purpose of a range signal, times the arrival of the pulse relative to its scheduled transmit time and converts this to range using sounds speed; time*sound_speed=range. This exemplary calculation assumes that the device-to-track and the beacon are at substantially the same depth. If the device-to-track is at a substantially different depth than the beacon, the device-to-track can calculate the actual time of flight of the range pulse, and the time of flight of the range signal if the device-to-track were in the same plane as the beacon. The device-to-track can then offset the send time of the range pulse so that the measured range at the beacon corresponds to the range in the plane of the beacon.

A method for transmitting bearing information is also provided. In one embodiment, a convention is defined for coding an angle between 0-359.9999 degrees. One convention can be to define a time at the master that equals a bearing of 0 degrees and a time that equals a bearing of 360. In this example we will use 80 ms=0 degrees, 800 ms=360 degrees and define a linear relationship between those two points. When the master hears the ping is uses the following math to calculate the transmitted bearing angle: bearing_angle=(time−0.08)/0.720*360; where time is in seconds, angle is degrees. With this example, the vehicle can send the range (<0.1 m error) and angle (<0.1 degrees) with very high accuracy. For the vehicle to send it's bearing, the vehicle can send the bearing signal so that it arrives at the correct "angle_time," which is angle_time=(bearing_angle/360)*0.720+0.08. The time to send the ping is based on the travel_time_to_master (sec), which is calculated above based upon range and the speed of sound in water. This time to send may be before the top of a cycle or after. Ping-send-time=angle_time−travel_time_to_master; If the result is negative, the signal would be sent this amount time before the correct top of the cycle; If the result is positive, the signal would be sent this amount of time after the top of the cycle.

Table 2 provides an exemplary schedule for sending and receiving information by both the beacons and the vehicles. In the Table, beacon data slots are provided at times 0 to 3, 8 to 11, 16 to 19, 24 to 27, 32 to 35, 40 to 43, 48 to 51, and 56 to 59, vehicle range slots are provided at times 4, 7, 12, 15, 20, 23, 28, 31, 36, 39, 44, 47, 52, and 55, and vehicle bearing slots are provided at times 5, 6, 13, 14, 21, 22, 29, 30, 37, 38, 45, 46, 53, and 54.

In table 2, the bearing transmit cycles are in 1 seconds slots that are surrounded by Range transmit cycles. This allows for RANGE pings that are sent at the TOP of the cycle to propagate out of the field of sound in 1500 M (approximately) in approximately 1 seconds of sound travel. The Bearing data has to be delayed to deliver the reception at the gateway beacon at a time that could require it to be sent in the previous second. From the point of view of the gateway beacon, they will all be in order, but the rest of the system could hear them at times in the adjoining time slot that could cause confusion for the beacon range pings. In the above table, there is a vehicle range slot on either side of a set of bearing cycles to keep the data clean for following beacon data slots where the beacons send their range pings.

One exemplary feature of the inventive system, illustrated in Table 2, is that many vehicles can transmit range or bearing in a single cycle. Because vehicles also have dedicated time slots for range and bearing data in this schedule, the unambiguous position every vehicle is tracked during the schedule. Further, even where several vehicles are tracked in a single cycle (for example, at time slots 28 and 29), as long as the acoustic pings don't conflict (i.e. the ranges are separated by more than a sound pulse, or the bearing angles are different such as the pulses don't collide), those vehicles can be unambiguously tracked as well. If there is ambiguity, the last position of each vehicle and its max possible speed over can be used to sort out which new range or bearing belongs to which vehicle for a position update. If the data cannot be resolved, the position update can wait for a single vehicle cycle range or bearing to get a true position update for that vehicle, adding some latency in the cases that have conflicts. Because the beacons can send messages to all the objects, a scheme could be devised where the vehicles could be assigned to use a different cycle to avoid signal collision/overlaps due to a range or bearings that are too close to detect separately.

As an example, one could track 64 vehicles where each sends a 1 ms ping in the range cycle and a 1 ms ping in the bearing cycle with no data. The cycle would have a very low data rate, i.e. ping vs. quiet of 64 ms/1000 ms=6.4% of the cycle. In table 2 there are four range and bearing cycles defined for ALL VEHICLES every minute, if the beacon commanded the different vehicles to report in specific cycles the system could reduce the chance of the reported data colliding with other data from another vehicle since it's last position and max speed will let you bound where the next data could report. In such a scheme you could get a position update between 15 and 60 seconds based on the arrangement.

As noted above, the example system described in Table 2 provides vehicle transmission slots for range and bearing pings. In the case of a range ping, the vehicle may send 16 bits of data after the range ping within the same time slot. The inter-ping time could be 5 ms allowing a small time for multipath and echoes to die down between bits, allowing a bit rate of 200 bps. This bit time can be extended to allow for acoustic channels with high reverberation and multi-path signals. The data rate and sizes could be defined in advance or sent in real time from the beacon to the nodes to change the mode using his messaging capability. A scheme using 16 bits allows for an ID of 8 bits for addressing vehicles, 254 plus a multicast message ID, 255 and an 8 bit data packet. This small amount of data is enough to implement very powerful command and control schemes. Some general examples of commands could include: "surface and get an Iridium radio data message," or "move to location A and park underwater to avoid traffic," or "resume mission," etc.

Table 2 provides beacon transmission slots. Each beacon can send data to any or all vehicles. In a typical system the beacons have the acoustic traducers on the ocean/lake floor and have a small wire to connect to GPS and radio on the surface. The beacons could all be on so as to radio and relay commands and data between operators and vehicles. These could be Iridium satellite SBD data modems and the data could be sent worldwide, including near the poles.

When a vehicle sends a data message to its master beacon during its dedicated time slot, its address is implicit since it is the only transmitter in that time slot. The ALL vehicle slots don't support data since multiple vehicles are sending a ping to signify position. The number of bits is shown as eight in this example as it is very simple to send bits at a very slow rate as the inter-symbol echoes and reflections die down. If the sound channel is echo free, a much higher bit rate could be defined. Eight bits each for 255 addressable messages provides a reasonable framework to define basic command and control for a large class of vehicles.

When data is sent in this scheme a tone in the time slot is a "1" and no tone is a "0", other schemes could be defined. As each object in the system has a precisely synchronized time base, the system could use a scheme where each bit or group of bits can come from a different vehicle as defined in published U.S. patent application 2015/0288459, titled "Method and Apparatus for Underwater Acoustic Communications," filed on Mar. 31, 2015, which application is hereby incorporated by reference in its entirety.

TABLE 3

Example system that uses six different frequencies to increase the data rate and reduce latency

| Time (sec) | Cycle | F0 - 26 Khz | F1 - 28 Khz | F2 - 30 Khz | F3 - 32 Khz | F4 - 34 Khz | F5 - 36 Khz |
|---|---|---|---|---|---|---|---|
| 0 | 0 | Beacon0 Range | Beacon 1 Range | Beacon 2 Range | Beacon 3 Range | Range + data | Bearing |
| 2 | 0 | Beacon0 Range | Beacon 1 Range | Beacon 2 Range | Beacon 3 Range | Range + data | Bearing |
| 4 thru 56 | 0 | Beacon0 Range | Beacon 1 Range | Beacon 2 Range | Beacon 3 Range | Range + data | Bearing |
| 58 | 1 | System data broadcast 32 bits | System data broadcast 32 bits | System data broadcast 32 bits | System data broadcast 32 bits | System data broadcast 32 bits | System data broadcast 32 bits |

Figure 3:
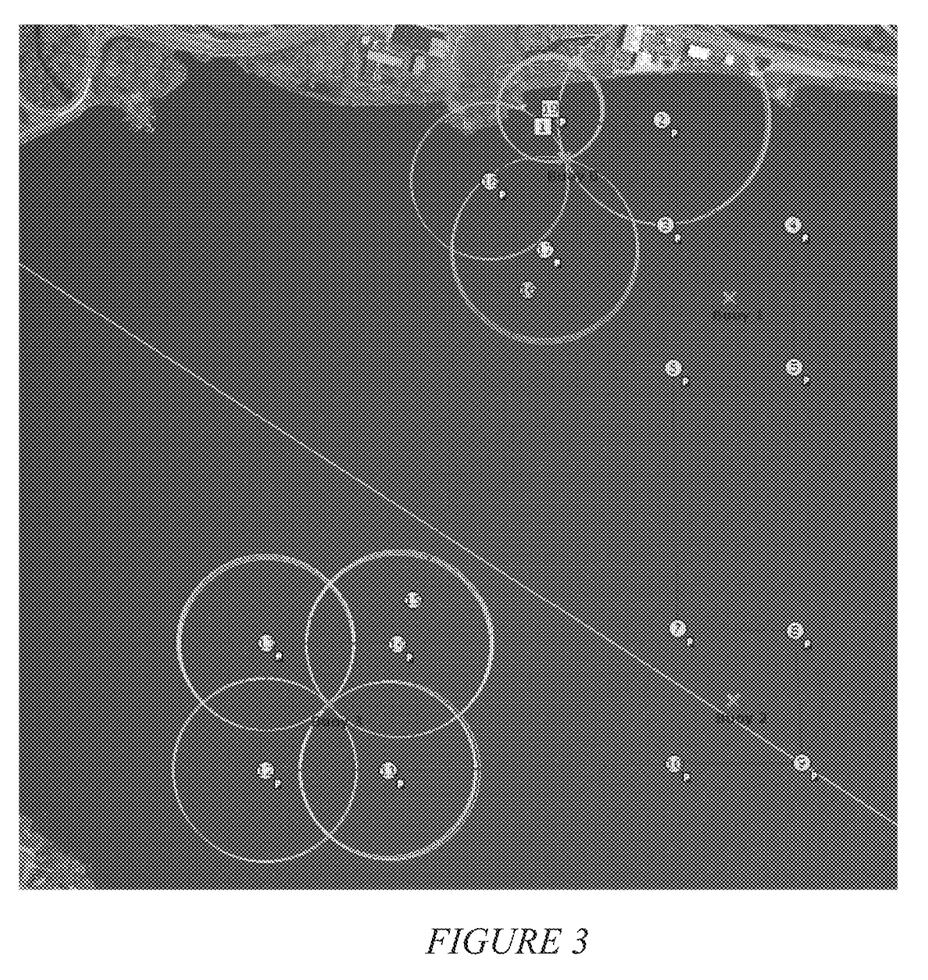
FIG. 3 illustrates a beacon survey using GPS and Ranges from the beacons.

It is important to have accurate real time sound speed for the signals used in the inventive system. Using the system of U.S. Pat. No. 8,009,516 the locations of the beacons are surveyed in place using vehicles on the surface with GPS position receiving onboard and a transducer in the water. The surveying process could use ranging pulses from the beacons and record the LAT, LONG for each. The range rings will converge on the beacon location in the water column. This process is shown in FIG. 3, where the beacon positions are being surveyed using this graphical method. The system can measure the sound speed between all beacons by listening to the range pings and using the time and the knowledge of their position, and the bulk sound speed can be calculated. They can then calculate sound speed every range cycle; sound-speed=distance/sound-travel-time. This information can be send out in a defined cycle. For example, the data sent by beacon 1 in second 56 of table 2 could be a signed 16 bit number that gives the sound speed offset from 1500 m/s. In this example, sound speed is 1500 plus an offset to a precision of 0.01, which is enough dynamic range to cover all real water sound speeds.

Each beacon can listen to the pings of each beacon to allow the system to detect the average sounds speed in the water volume between a particular sender and receiver. This assumes that the beacons are stationary and fixed in position. If an error occurs and a beacon either moves off station or its time becomes unsynchronized, this can be detected as its will give a sound speed that doesn't match the others to an acceptable tolerance. This can be reported using a broadcast message telling the other nodes to not use this beacon. The complete system can operate with as few as two beacons if the position solution is needed in real time from U.S. Pat. No. 8,009,516 or as few as a single beacon if the vehicle is using another positioning scheme such as a Kearfott Sea Devil inertial navigation device.

An alternate cycle design for sending range and bearing and data is shown in table 3. This system uses a two second long cycle period that will allow for about 3000 M of sound travel in a given cycle. This time could be raised to 4 seconds and allow 6000 M of sound travel for systems using lower frequency acoustic signals where the signal can propagate longer distances. The example system in Table 3 uses six unique frequencies that can be transmitted simultaneously with no interference. The Doppler shift should also be accounted for from the slow moving objects being tracked when selecting the frequency separation. Table 3 shows a system where the cycle is 2 seconds and six frequencies are used. The cycles such as RANGE in Table 3 can also have similar data attached as shown in table 2. This example shows that multiple frequencies for different cycle types can be used at the same time and there will not be conflicting data as long as each can be sent and detected with low enough interference. If the system is used to cover a very large area with many sets of beacons spread over the area different frequencies can be used to avoid interference from adjacent systems.

Another variation of the scheme is one in which the vehicles send their location in meters from the beacon in NORTH/SOUTH and EAST/WEST. A pair of singed distances could be used to locate the vehicle with respect to the beacon1 position. These could be transmitted using a scheme as described for the bearing number. The basic concept of sending a ping to arrive at a time at the master beacon such that the time scale equates to a variable. These pings can be sent and received with a high degree of accuracy such that a single ping could send a value with 14-16 bits of precision. While North and East are used as examples, any appropriate orthogonal axes could be used. It is further noted that orthogonal in this case need not be limited to axes that are separated by 90°, but includes axes that are at greater than about 45°.

An example of the math to generate the timing for a ping to send a position in X, Y or North and East follows: Max range+/−1000 meters; Say the vehicle position is 298.32 Meters North and 923.23 meters East of the beacon. This results is a pair of signed numbers, where + is North and East and − is South and West; +298.32 and −923.23. These will be transmitted like the bearing in the previous example, we will set the arrival time at the beacon such as to code the number. Calculating the send time from the remote device; SendTime=(distance+1000)/2000*0.800+0.08. When the time is received, the distance would come back as: distance=(time-0.08)*2000-1000. This time can be sent as in the case of the bearing for each of the two distances Northing and Easting: i.e., arrives at 0.08 sec=−1000, arrives at 0.800 second=+1000 and a linear scale between the two times.

Figure 4:
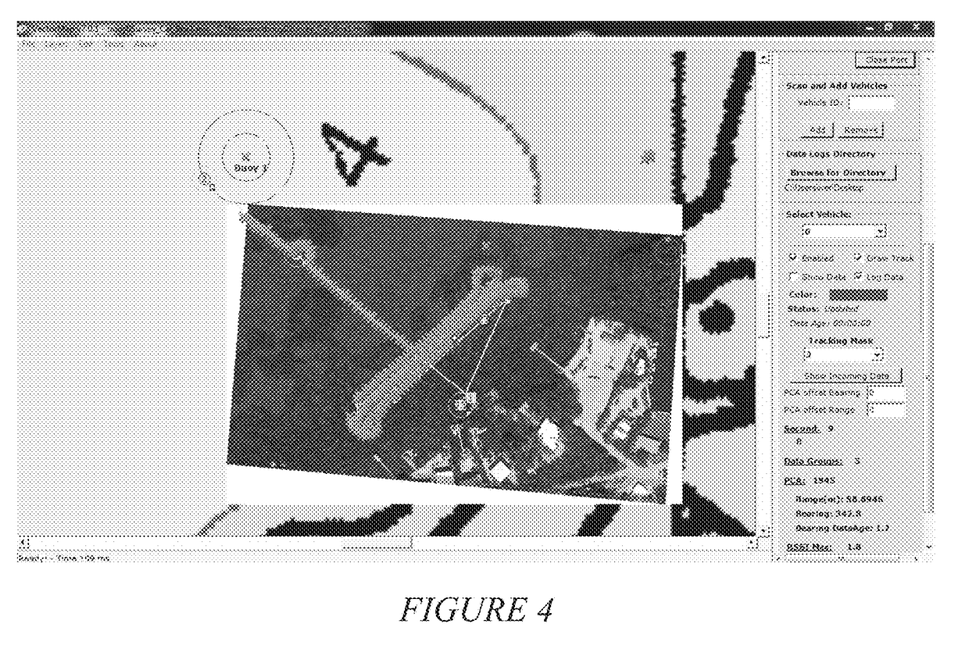
FIG. 4 illustrates a screen shot a computer software application in communication with a system of the invention to provide user interaction with a tracking system of the invention.

The screen capture in FIG. 4 shows an actual result of tracking an underwater vehicle on the same chart/image source the mission was planned. The red "+" symbols are showing a tracking update every 8 seconds as the vehicle rand its mission. The beacons can be configured with known data communications of any convenient and effective type, such as wired, wireless, cellular, or satellite data communications. In this way, the beacons can provide real-time or near real-time data on the device(s) being tracked to a user computer device that can display them, for example, as illustrated in FIG. 4.

In addition to providing accurate tracking over a large area with a large number of devices-to-track, because the devices can send position data with two pings, (1) the devices use less energy to transmit position data than with other schemes, and (2) when the devices use sonar, there is minimal interference with the sonar.

A person of ordinary skill in the art will appreciate further features and advantages of the invention based on the above-described embodiments. For example, specific features from any of the embodiments described above may be incorporated into devices or methods of the invention in a variety of combinations and subcombinations, as well as features referred to in the claims below which may be implemented by means described herein. Accordingly, the invention is not to be limited by what has been particularly shown and described, except as indicated by the appended claims or those ultimately provided. Any publications and references cited herein are expressly incorporated herein by reference in their entirety.

The invention claimed is:

1. A method for tracking a position of an underwater device-to-track, the method comprising:
providing a beacon on or below the surface of the water, the beacon being located in a known position;
providing the device-to-track below the surface of the water, the device-to-track having information identifying its location with respect to the beacon;
providing each of the beacon and the device-to-track with a synchronized time base;
sending a range acoustic pulse from the device-to-track to the beacon, the timing of the range acoustic pulse, relative to the synchronized time base, representing a range from the device-to-track to the beacon;
sending a bearing acoustic pulse from the device-to-track to the beacon, the timing of the bearing acoustic pulse, relative to the synchronized time base, representing a bearing from the device-to-track to the beacon;
calculating the location of the device-to-track based on the range from the device-to-track to the beacon, the bearing from the device-to-track to the beacon, and the known position of the beacon.

2. The method of claim 1, wherein the range acoustic pulse is sent at a predetermined time in the synchronized time base and the beacon measures a time of arrival.

3. The method of claim 2, wherein the range is calculated based upon the time difference between the predetermined time, the time of arrival, and the speed of sound.

4. The method of claim 3, wherein a plurality of beacons having known positions are provided and the speed of sound is determined by sending at least one ranging pulse between at least two of the beacons.

5. The method of claim 1, wherein the sending of the bearing acoustic pulse is timed to arrive at the beacon at a time that indicates a bearing angle.

6. The method of claim 1, further comprising two way communication between the beacon and the device-to-track.

7. The method of claim 6, wherein the two way communication takes place in a repeating sequence of time cycles with each time cycle having a defined communication.

8. The method of claim 7, wherein the beacon sends digital data communications to the device-to-track during at least one of the cycles.

9. The method of claim 8, wherein the device-to-track sends digital data communications to the beacon during at least one of the cycles.

10. The method of claim 6, wherein there are a plurality of devices-to-track, and each device-to-track sends a range acoustic pulse during a different cycle.

11. The method of claim 6, wherein there are a plurality of devices-to-track, and each device-to-track sends a range acoustic pulse during the same cycle and each device-to-track uses a different frequency for its range acoustic pulse.

12. The method of claim 1, wherein the sending of the range acoustic pulse is offset in time to account for a difference in depth between the beacon and the device-to-track.

13. A method for tracking a position of an underwater device, said underwater device being a device-to-track, comprising:
providing a beacon on or below the surface of the water, the beacon being located in a known position;
providing the device-to-track below the surface of the water, the device-to-track having information identifying its location with respect to the beacon;
providing each of the beacon and the device-to-track with a synchronized time base;
sending a first range acoustic pulse from the device-to-track to the beacon, the timing of the first range acoustic pulse representing a range from the device-to-track to the beacon in a first direction;
sending a second range acoustic pulse from the device-to-track to the beacon, the timing of the second range acoustic pulse representing a range from the device-to-track to the beacon in a second direction that is orthogonal to the first direction;
calculating the location of the device-to-track based on the range from the device-to-track to the beacon in the first direction, the range from the device-to-track to the beacon in the second direction, and the known position of the beacon.

14. A method for tracking a position of an underwater device, the underwater device being a device-to-track, comprising:
providing a beacon on or below the surface of the water, the beacon being located in a known position;
providing a the device-to-track below the surface of the water, the device-to-track having information identifying its location with respect to the beacon;
providing each of the beacon and the device-to-track with a synchronized time base;
sending a first location acoustic pulse from the device-to-track to the beacon, the timing of the first range acoustic pulse, relative to the synchronized time base, representing a first location information from the device-to-track to the beacon;
sending a second location acoustic pulse from the device-to-track to the beacon, the timing of the second range acoustic pulse, relative to the synchronized time base, representing a second location information from the device-to-track to the beacon;
calculating the location of the device-to-track based on the first location information, the second location information, and the known position of the beacon.

15. The method of claim 14, wherein the first location information is a range and the second location information is a bearing.

16. The method of claim 14, wherein the first location information is a range in a first direction and the second location information is a range in a second direction that is orthogonal to the first direction.

17. The method of claim 13, wherein:
the synchronized time base comprises a first time slot, and a second time slot distinct from the first time slot; and
sending the first range acoustic pulse from the device-to-track to the beacon comprises sending the first range acoustic pulse during the first time slot; and
sending the second range acoustic pulse from the device-to-track to the beacon comprises sending the second range pulsed during the second time slot.

18. The method of claim 17, wherein the timing of the first range acoustic pulse, relative to the synchronized time base, comprises the position of the first range acoustic pulse within a defined arrival window within the first time slot.

19. The method of claim 14, wherein:
the synchronized time base comprises a first time slot, and a second time slot distinct from the first time slot; and
sending the first location acoustic pulse from the device-to-track to the beacon comprises sending the range acoustic pulse representing the first location information from the device-to-track to the beacon during the first time slot; and
sending the second range acoustic pulse from the device-to-track to the beacon comprises sending the second range acoustic pulse representing the range from the device-to-track to the beacon during the second time slot.

20. The method of claim 19, wherein the timing of the first range acoustic pulse, relative to the synchronized time base, comprises the position of the first range acoustic pulse within a defined arrival window within the first time slot.

* * * * *